(12) United States Patent
Zheng et al.

(10) Patent No.: US 12,281,566 B2
(45) Date of Patent: Apr. 22, 2025

(54) SYSTEMS AND METHODS FOR DETECTING DOWNHOLE TOOL LOCATION INSIDE A BOREHOLE

(71) Applicant: Halliburton Energy Services, Inc., Houston, TX (US)

(72) Inventors: Yibing Zheng, West University Place, TX (US); Zhanyu Ge, Houston, TX (US); Yumei Tang, Tomball, TX (US); Gary Dean Althoff, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1312 days.

(21) Appl. No.: 15/757,949

(22) PCT Filed: Oct. 6, 2015

(86) PCT No.: PCT/US2015/054197
§ 371 (c)(1),
(2) Date: Mar. 6, 2018

(87) PCT Pub. No.: WO2017/061988
PCT Pub. Date: Apr. 13, 2017

(65) Prior Publication Data
US 2018/0347339 A1    Dec. 6, 2018

(51) Int. Cl.
*E21B 47/09* (2012.01)
*E21B 47/002* (2012.01)
(Continued)

(52) U.S. Cl.
CPC .......... *E21B 47/09* (2013.01); *E21B 47/0025* (2020.05); *E21B 47/0224* (2020.05);
(Continued)

(58) Field of Classification Search
None
See application file for complete search history.

(56) References Cited

U.S. PATENT DOCUMENTS 4,958,125 A * 9/1990 Jardine ................... E21B 12/02
324/162
5,229,552 A    7/1993 Cole
(Continued)

FOREIGN PATENT DOCUMENTS

CA    2620905 A1    10/2003
CA    2615392       2/2005

OTHER PUBLICATIONS

International Search Report and Written Opinion of PCT Application No. PCT/US2015/054197 dated Jul. 4, 2016: pp. 1-15.
(Continued)

*Primary Examiner* — Arleen M Vazquez
*Assistant Examiner* — Leonard S Liang
(74) *Attorney, Agent, or Firm* — K&L Gates LLP

(57) ABSTRACT

A method of obtaining position of a downhole tool with respect to a wellbore includes logging well data via the tool over a period of time and measuring a lateral acceleration of the tool over the period of time with one or more accelerometers embedded in the tool. The method further includes performing double integration on an acceleration of the tool over a period of time. The method also includes obtaining a displacement of the tool over the period of time from the double integration. The method also includes fitting the displacement of the tool over the period of time to a best fit curve. The method also includes subtracting the best fit curve from the displacement of the tool over the period of time.

18 Claims, 7 Drawing Sheets

(51) Int. Cl.
*E21B 47/0224* (2012.01)
*G01V 1/48* (2006.01)
*E21B 44/00* (2006.01)
*E21B 44/02* (2006.01)
*E21B 47/00* (2012.01)
*E21B 47/022* (2012.01)
*E21B 47/024* (2006.01)
*E21B 47/04* (2012.01)
*G01V 3/26* (2006.01)
*G01V 3/32* (2006.01)

(52) U.S. Cl.
CPC ............... *G01V 1/48* (2013.01); *E21B 44/00* (2013.01); *E21B 44/02* (2013.01); *E21B 47/00* (2013.01); *E21B 47/022* (2013.01); *E21B 47/024* (2013.01); *E21B 47/04* (2013.01); *G01V 3/26* (2013.01); *G01V 3/32* (2013.01); *G01V 2200/16* (2013.01); *G01V 2210/54* (2013.01)

(56) References Cited

U.S. PATENT DOCUMENTS

| | | | | |
|---|---|---|---|---|
| 5,583,825 | A | * | 12/1996 | Carrazzone ............ G01V 1/288 367/83 |
| 5,585,726 | A | | 12/1996 | Chau |
| 6,065,219 | A | | 5/2000 | Murphey et al. |
| 6,091,500 | A | * | 7/2000 | Bahr .................... G01B 11/105 356/73.1 |
| 6,459,992 | B1 | | 10/2002 | Freedman et al. |
| 6,466,020 | B2 | | 10/2002 | Kuckes et al. |
| 6,467,341 | B1 | | 10/2002 | Boucher et al. |
| 6,825,659 | B2 | | 11/2004 | Prammer et al. |
| 6,898,967 | B2 | | 5/2005 | Macpherson |
| 7,055,601 | B2 | | 6/2006 | Barrow |
| 7,142,985 | B2 | | 11/2006 | Edwards |
| 7,584,808 | B2 | | 9/2009 | Dolgin et al. |
| 8,065,085 | B2 | | 11/2011 | Ekseth et al. |
| 8,260,554 | B2 | | 9/2012 | Morys |
| 2004/0123655 | A1 | | 7/2004 | MacPherson |
| 2005/0071120 | A1 | | 3/2005 | Hutchinson |
| 2005/0088176 | A1 | * | 4/2005 | Kruspe ................ G01N 24/081 324/303 |
| 2006/0065401 | A1 | * | 3/2006 | Allen ..................... E21B 44/00 166/345 |
| 2006/0113111 | A1 | * | 6/2006 | Martinez ................ E21B 47/08 175/45 |
| 2009/0222209 | A1 | | 9/2009 | Morys |
| 2009/0271115 | A1 | * | 10/2009 | Davis .................... E21B 47/022 702/6 |
| 2012/0191354 | A1 | * | 7/2012 | Caycedo ............... E21B 47/022 702/9 |
| 2013/0032401 | A1 | * | 2/2013 | Edbury ................. E21B 47/003 175/24 |
| 2013/0248247 | A1 | | 9/2013 | Suglura |
| 2015/0240622 | A1 | * | 8/2015 | Bang ...................... E21B 47/00 702/11 |
| 2018/0023385 | A1 | * | 1/2018 | Bang ....................... G01V 3/18 175/45 |

OTHER PUBLICATIONS

Extended European Search Report dated May 2, 2019, for European patent application No. 15905932.8, filed on Oct. 6, 2015 (PCT effective).

* cited by examiner

SYSTEMS AND METHODS FOR DETECTING DOWNHOLE TOOL LOCATION INSIDE A BOREHOLE

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Downhole logging operations provide valuable information regarding various conditions and parameters of a wellbore. Typically, a signal is emitted from a logging tool inside the wellbore towards the surrounding formation. The logging tool then records a returning signal which carries data regarding the wellbore and surrounding formation. In ideal acoustic logging operations, the logging tool remains in the center of the wellbore and travels smoothly and evenly downhole. However, in practice, such stability of the logging tool may be difficult achieve. Rather, the logging tool may experience erratic motion relative to the wellbore, degrading the data collected. For example, a shift in the sensitive volume of the logging tool caused by lateral motion of the tool relative to the borehole can distort the received signal and produce inaccurate measurements. Such distortions can be especially pronounced in logging-while-drilling (LWD) and measurement-while-drilling (MWD) environments, where the tool itself is subjected to severe vibration and forces from impact of the drill bit.

BRIEF DESCRIPTION OF THE DRAWINGS

For a detailed description of the embodiments of the invention, reference will now be made to the accompanying drawings in which.

DETAILED DESCRIPTION

The present disclosure provides methods and systems for detecting the location of a logging tool inside a borehole. Knowing the location allows for calibration of the obtained well data and images, thereby reducing blurriness and other defects caused by off-center or moving logging tools.

Figure 1:
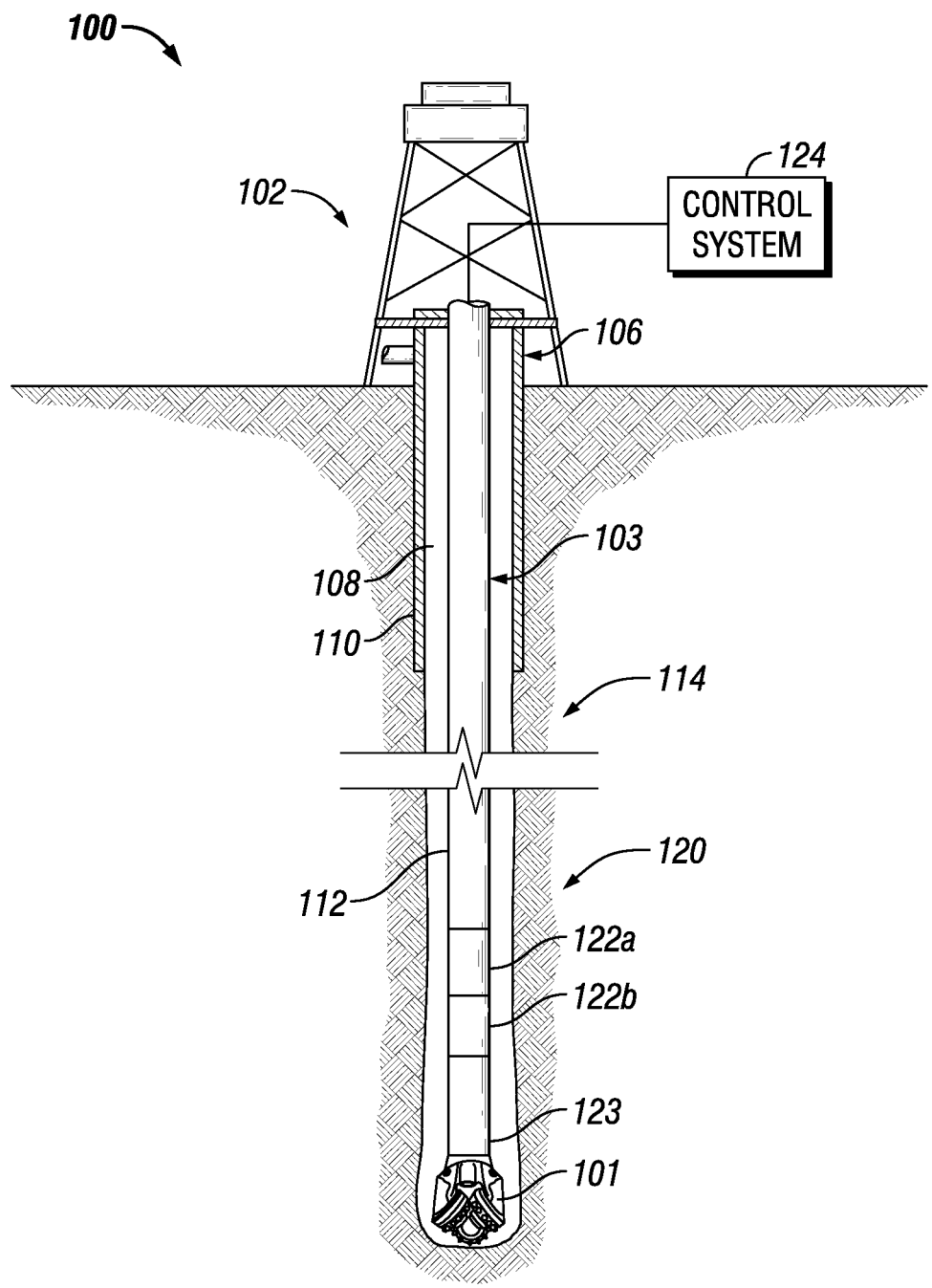
FIG. 1 illustrates a logging operation.

Referring to the drawings, FIG. 1 illustrates a schematic view of a drilling operation 100, in accordance with example embodiments of the present disclosure. Various types of drilling equipment such as a rotary table, drilling fluid pumps and drilling fluid tanks (not expressly shown) may be located at a well site 106. For example, the well site 106 may include a drilling rig 102 that has various characteristics and features associated with a "land drilling rig." However, downhole drilling tools incorporating teachings of the present disclosure may be satisfactorily used with drilling equipment located on offshore platforms, drill ships, semi-submersibles and drilling barges.

The well 114 formed by the drilling system 100 may be a vertical well, such as that illustrated in FIG. 1. In some other embodiments, the well 114 may be a horizontal well or a directional well having a range of angles. Thus, the well system 100 can be a vertical drilling system or a directional drilling system. The well 114 may be defined at least in part by a casing string 110 that may extend from the surface of the well site 106 to a selected downhole location. Portions of the well 114 that do not include the casing string 110 may be described as "open hole."

The drilling system 100 may include a drill string 103 suspended down-hole in the well 114 from the well site 106 to create an annulus 108 surrounding the drill string 103. The drill string 103 includes a drill pipe 112, a bottom hole assembly (BHA) 120, and a drill bit 101. The drill pipe 112 may include a plurality of segments, each of which are added to the drill pipe 112 as the well 114 is drilled and increasing length of drill pipe 112 is required. The drill pipe 112 provides the length required for the BHA 120 to reach well bottom and drill further into the formation. The drill pipe 112 may also deliver drilling fluid from surface facilities at the well site 106 to the BHA 120.

The BHA 120 may include a wide variety of components configured to assist in forming of the wellbore 114. For example, the BHA 120 may include components 122a and 122b. Such components 122a and 122b may include, but are not limited to, drill collars, rotary steering tools, directional drilling tools, downhole drilling motors, reamers, hole enlargers or stabilizers, and the like. The number and types of components 122 included in the BHA 120 may depend on anticipated downhole drilling conditions and the type of wellbore that is to be formed. The BHA 120 also includes logging while drilling (LWD) tools and/or measurement while drilling (MWD) tools 123. The LWD/MWD tools 123 are configured to collect data regarding the wellbore during drilling.

Aspects of the drilling operation, including the LWD/MWD tool 123 and other parts of the BHA 120 may be controlled by an above-ground control system 124. The control system 124 transmits instructions to the BHA 120 and receives feedback or data from the BHA 120 such as data collected by the LWD/MWD tool 123.

In some example applications, the LWD/MWD tool 123 are configured to perform borehole imaging, which is commonly used to inspect the wellbore 114 wall conditions to detect formation fractures, geological beddings and borehole shapes. Borehole imaging may also be performed to inspect the casing for deformation, corrosion and physical wear. Two common types of borehole imaging include ultrasonic imaging and micro-resistivity imaging. In ultrasonic imaging, ultrasonic waves are aimed to the wellbore 114 wall, and the travel time and amplitude of the reflected waves are recorded to form an imaging of the wellbore 114. Micro-resistivity imaging sends the electric-magnetic waves into the wellbore 114 wall to generate resistivity images of the wellbore 114.

In order to generate clear wellbore 114 images, it is ideal to keep the LWD/MWD tool 123 centered and stable within the wellbore 114. However, this is difficult to accomplish due to movement and shaking of the BHA 120 during drilling. The impact of the drill bit 101 against the bottom of the wellbore 114 during drilling may cause more erratic motions of the LWD/MWD tool 123. Thus, the LWD/MWD tool 123 of the present disclosure is instrumented with one or more accelerometers and magnetometer from which movement and position data can be derived and used to filter the wellbore image, thereby reducing the blurring effects of the movement of the LWD/MWD tool 123.

Logging while drilling and measurement while drilling operation are example operations facilitated by the techniques provided herein. However, the systems and methods provided herein can also be applied to wireline logging operations and tools, and logging operations and logging tools in general.

Figure 2:
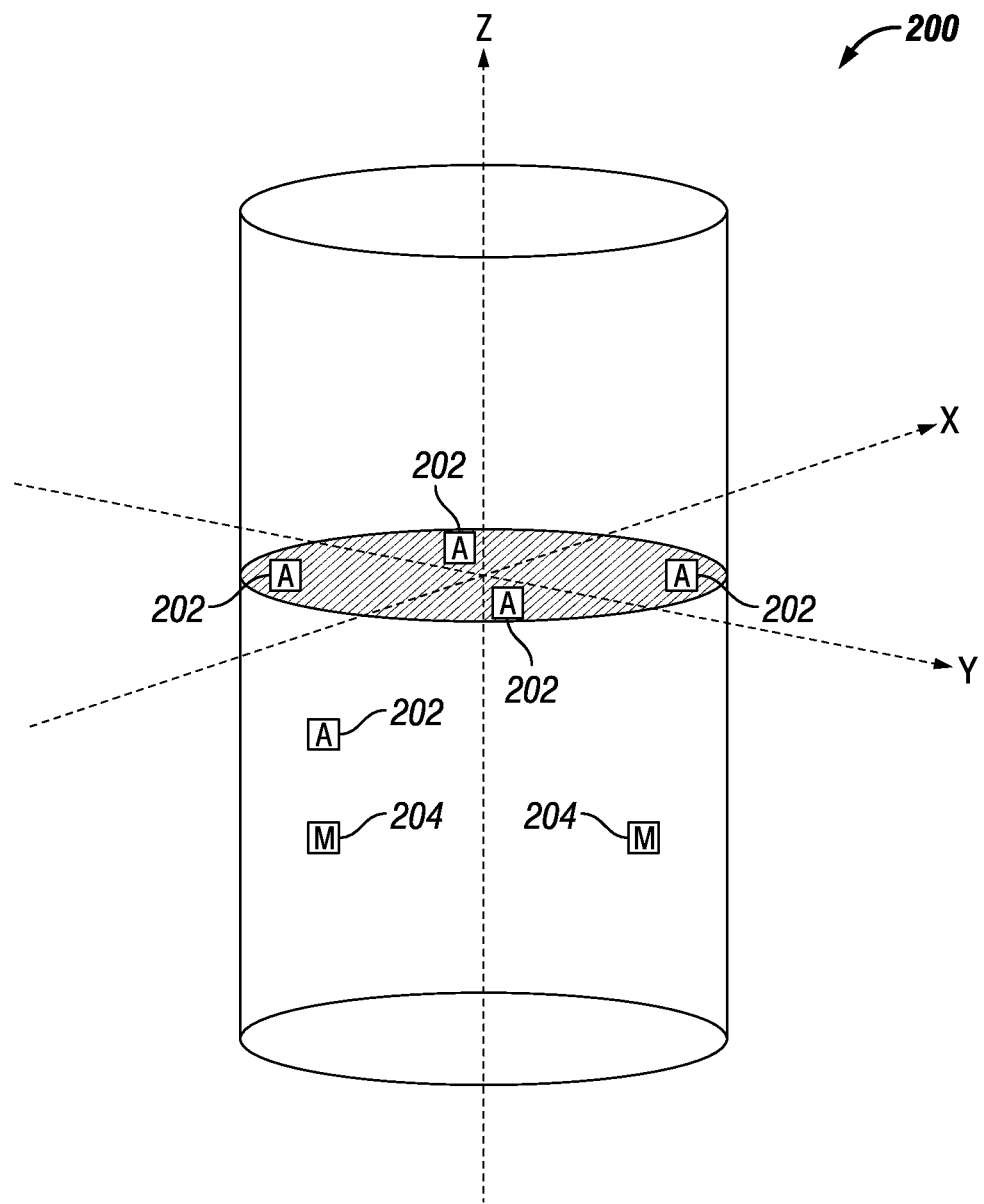
FIG. 2 illustrates a simplified representation of a logging tool with accelerometers and magnetometers.

FIG. 2 illustrates a representational diagram of a logging tool 200, such as LWD/MWD tool 123. Generally, the radial axis of the Logging tool 200 is defined as the z-axis, with the x-axis and y-axis being orthogonal to the z-axis. Lateral movement of the Logging tool 200 is defined as motion parallel to the x-y plane. In some embodiments, the Logging tool 200 includes two pairs of accelerometers 202, a pair placed on opposite radial sides of the tool's rotational axis. Each of the two pairs of accelerometers 202 detects both radial and tangential tool acceleration components parallel to the x-y plane. The Logging tool 200 may include an additional accelerometer configured to measure acceleration along the z-axis.

The Logging tool 200 further includes two magnetometers 204 placed orthogonally with respect to each other. The magnetometers 204 are configured to measure magnetic values along the x-axis and the y-axis, thereby detecting the magnetic phase of the Logging tool 200 (also called magnetic tool face). The combination of the magnetometers and the accelerometers allows lateral and angular acceleration of the Logging tool 200 to be derived even when the Logging tool 200 is tilted. The Logging tool 200 also includes a processor for sampling, processing, and/or transmitting the accelerometer and magnetometer signals. In other embodiments, the Logging tool 200 may include fewer or more accelerometers 202 and magnetometer 204 than illustrated in FIG. 2. The accelerometers 202 and magnetometers 204 may also be positioned differently on the Logging tool 200, as long as tool face and lateral accelerations can be obtained. Generally, more accelerometers produces results of higher fidelity, but fewer accelerometers 202 can also enable the techniques presented herein as well.

Data collected from the accelerometers 202 can be used to derive the position of the Logging tool 200 relative to the wellbore 114. This can be accomplished by integrating the acceleration over time using equations 1.1 and 1.2. With respect to equations 1.1 and 1.2, t is the time parameter and $t_0$ is the starting time, and x(t) and y(t) represent the x-y location of the tool center relative to the borehole center. $x_0$ and $y_0$ define the tool center's initial location relative to the borehole center. $v_{x0}$ and $v_{y0}$ are initial velocities in the x and y-direction, respectively. Generally, the initial velocities $v_{x0}$ and $v_{y0}$ and initial tool location $x_0$ and $y_0$ are not known in the beginning of the process.

$$x(t) = \iint a_x(t) dt^2 + v_{x0}(t-t_0) + x_0 \qquad \text{Eq. 1.1}$$

$$y(t) = \iint a_y(t) dt^2 + v_{y0}(t-t_0) + y_0 \qquad \text{Eq. 1.2}$$

Figure 3:
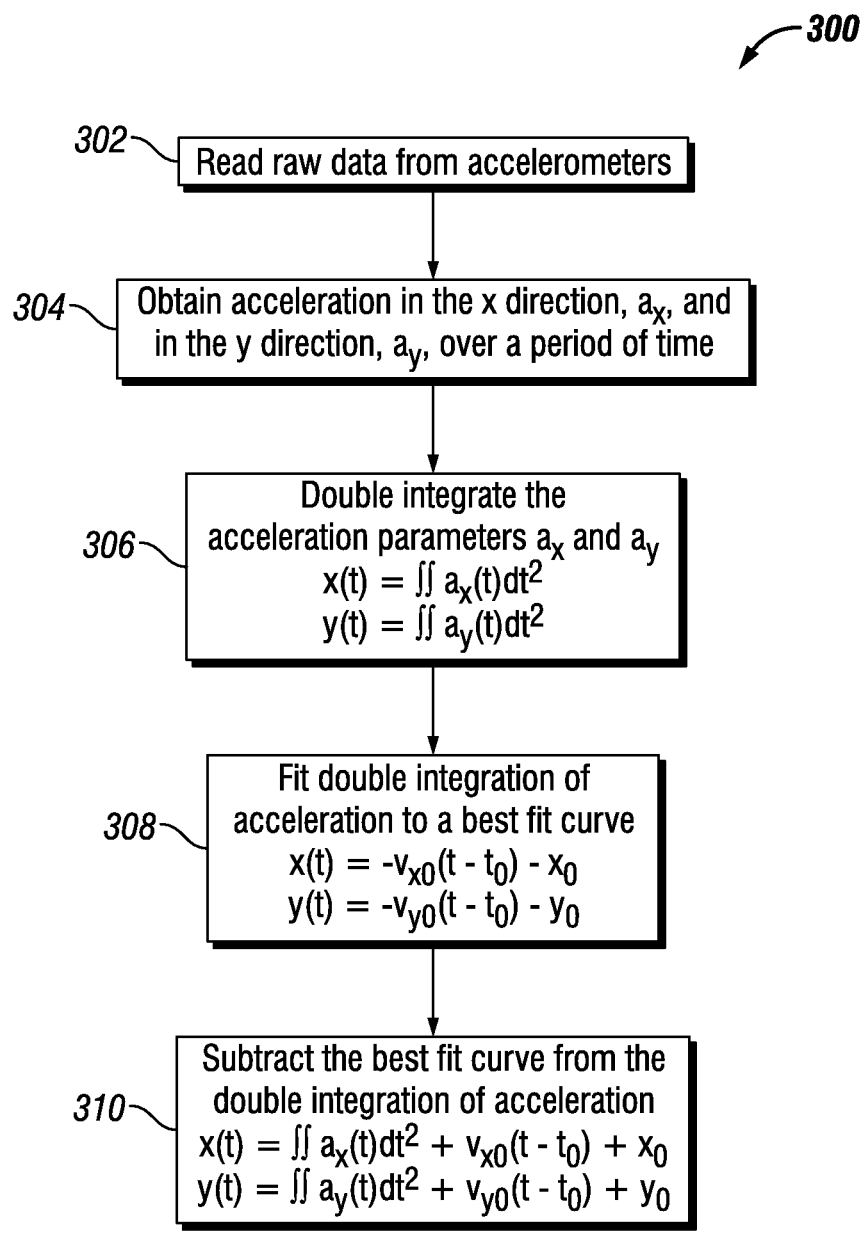
FIG. 3 is a flow chart illustrating a method of obtaining tool position from accelerometer data.
Figure 4A:
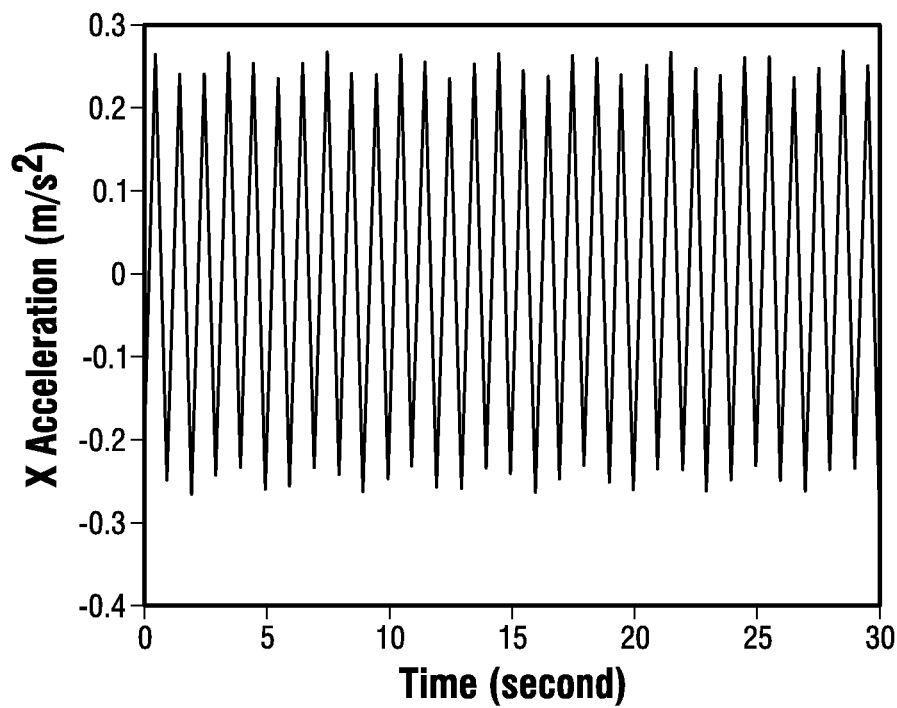
FIG. 4A is a plot of acceleration of a tool in the x-direction over a thirty second time period.
Figure 4B:
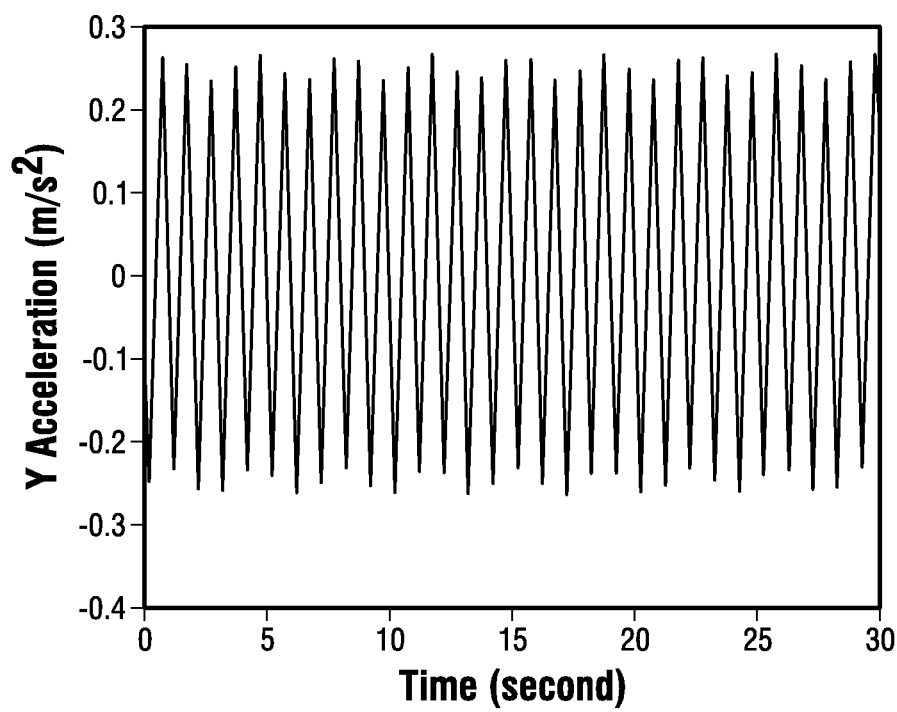
FIG. 4B is a plot of acceleration of the tool in the y-direction over the thirty second time period.

Accordingly, obtaining the position data from the accelerometers requires several steps. FIG. 3 is a flowchart illustrating a method 300 of obtaining tool position within a wellbore. The method 300 includes reading raw data from the accelerometers (step 302) and then translating the raw data into the tool's lateral accelerations in the x-direction, $a_x$, and in the y-direction, $a_y$ (step 304). FIGS. 4A and 4B are plots of simulated acceleration of a tool in the x-direction, and in the y-direction, respectively, over a thirty second time period.

The method further includes finding the displacement of the tool 200 over the time period by double integration of the acceleration parameters $a_x$ and $a_y$ according to equations 2.1 and 2.2 (step 306).

$$x(t) = \iint a_x(t) dt^2 \qquad \text{Eq. 2.1}$$

$$y(t) = \iint a_y(t) dt^2 \qquad \text{Eq. 2.2}$$

Figure 5A:
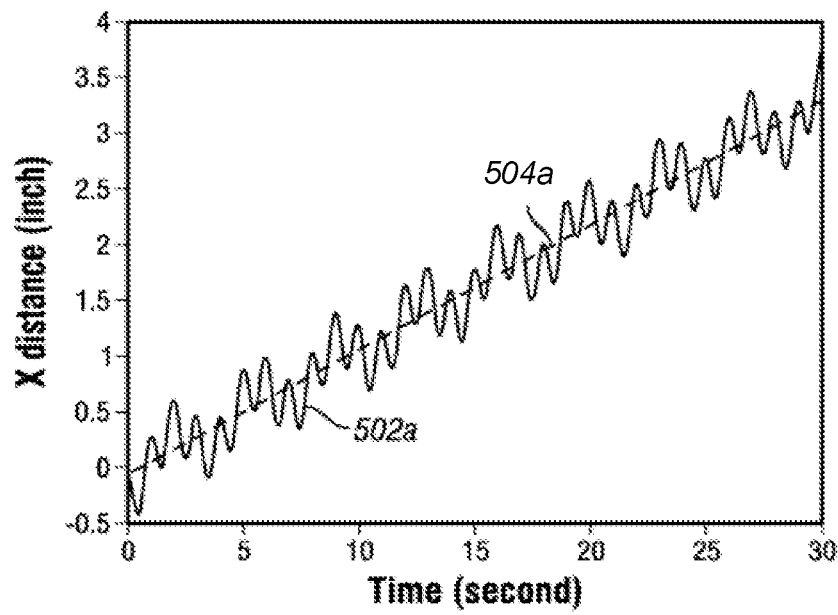
FIG. 5A is a plot of the displacement of the tool in the x-direction over the period of time and a best fit curve.
Figure 5B:
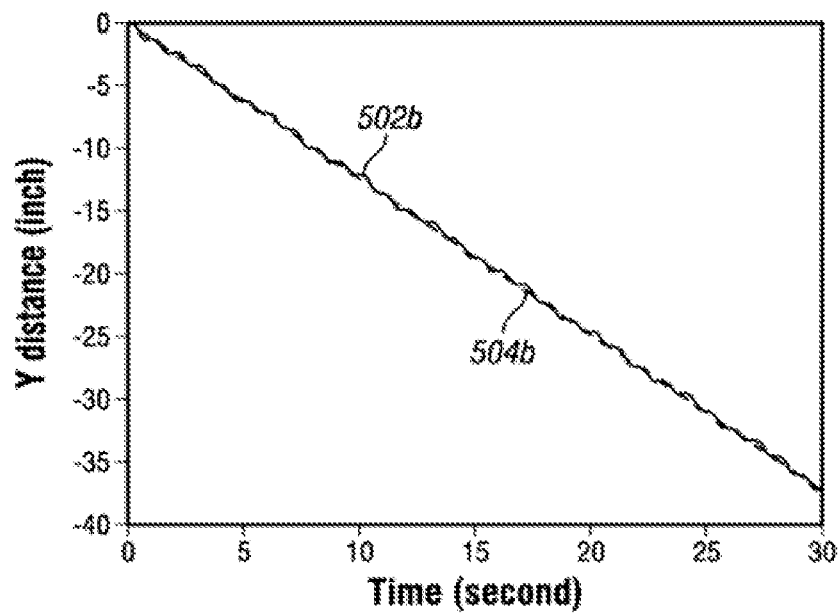
FIG. 5B is a plot of the displacement of the tool in the y-direction over the period of time and a best fit curve.

FIGS. 5A and 5B illustrate plots of the double integration (Eq. 2.1 and 2.2) over time, for the x parameter and y parameter, respectively. Specifically, FIG. 5A illustrates an x-direction displacement plot 502a (solid line) and FIG. 5B illustrates a y-direction displacement plot 502b (solid line). The up and down nature of both plots 502a and 502b indicates that the tool is moving back and forth in the x-direction as well as back and forth in the y-direction.

The method then includes fitting each double integration or displacement plots 502b and 502b, to a best fit curve (step 308). FIG. 5A illustrates the x-direction fit curve 504a (dotted line) and FIG. 5B illustrates the y-direction fit curve 504b (dotted line). Many curve fitting methods can be suitably used. For example, a linear least square fitting method can be used. Suppose that the results of the double time integration of the acceleration are $x_a(t)$ and $y_a(t)$. The least square fitting method finds the minimum of the sum of squares of difference between the fitted line and the positions ($x_a(t)$, $y_a(t)$) within a time period. In some embodiments, more weight can be put on the large differences, and then the squares of the weighted differences can be summed to find the minimum of the fitting function.

The best fit curve can be defined by equations 3.1 and 3.2.

$$x(t) = -v_{x0}(t-t_0) - x_0 \qquad \text{Eq. 3.1}$$

$$y(t) = -v_{y0}(t-t_0) - y_0 \qquad \text{Eq. 3.2}$$

It is known that motion of the Logging tool 200 is confined by the wellbore 114 and the outer shape of the tool 200, including any stabilizers installed on the tool 200. Thus, the maximum lateral motion is the difference between the wellbore 114 and the outer shape of the tool 200. Thus, any displacement greater than the maximum lateral motion is indicative of the wellbore 114 itself moving as well. The fit curves 504a and 504b can be interpreted as a fixed point of reference of the wellbore, such as well center, and track the displacement of the well. Thus, in order to derive the position of the tool relative to the well, the fit curves 504a and 504b are subtracted from the displacement plots 502a and 502b, respectively (step 310). This is equivalent to subtracting equations 3.1 and 3.2 from equations 2.1 and 2.1, respectively, which results in equations 1.1 and 1.2.

Figure 6A:
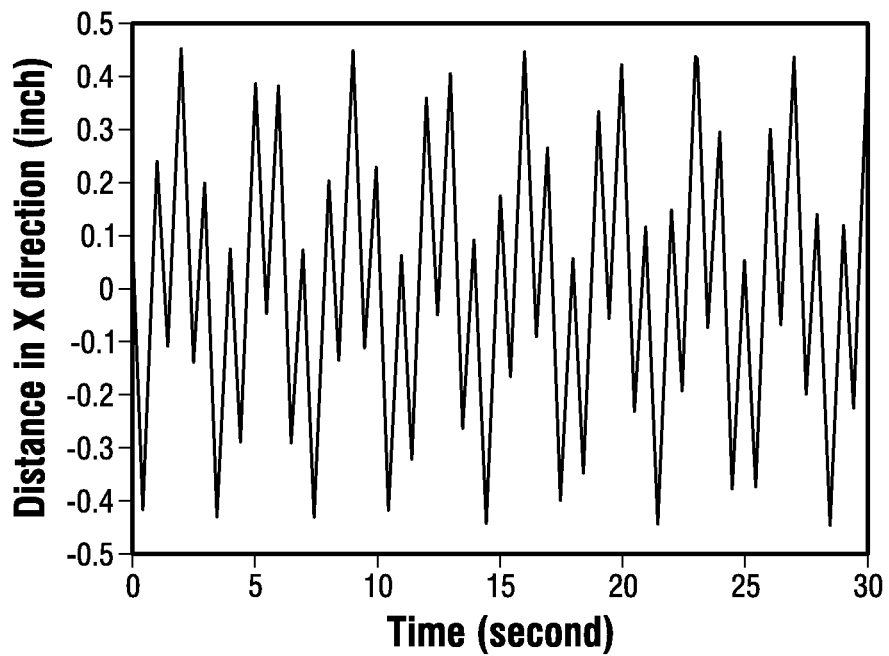
FIG. 6A is a plot of the position of the tool from well in the x-direction over the period of time.
Figure 6B:
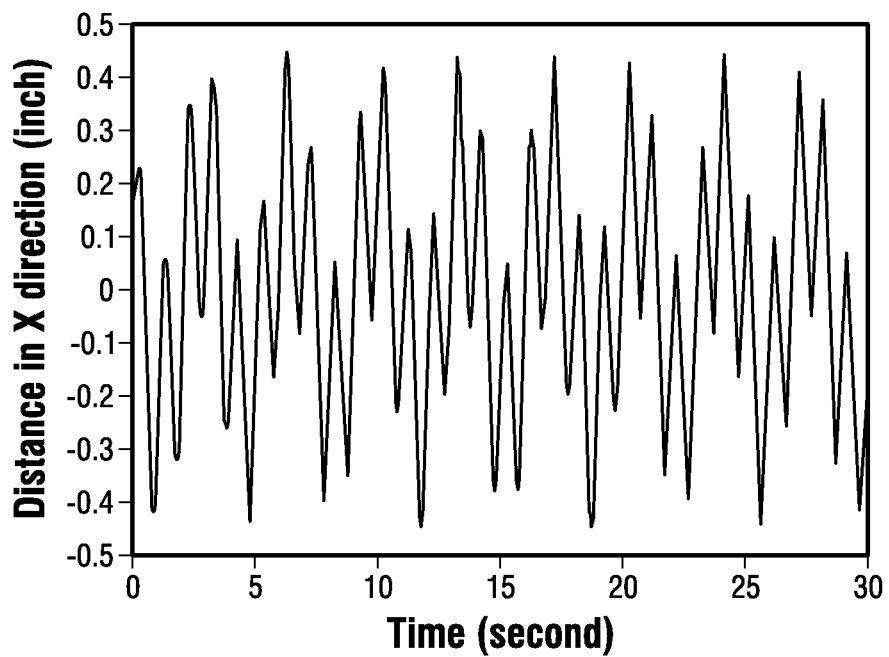
FIG. 6B is a plot of the position of the tool from well in the y-direction over the period of time.
Figure 7:
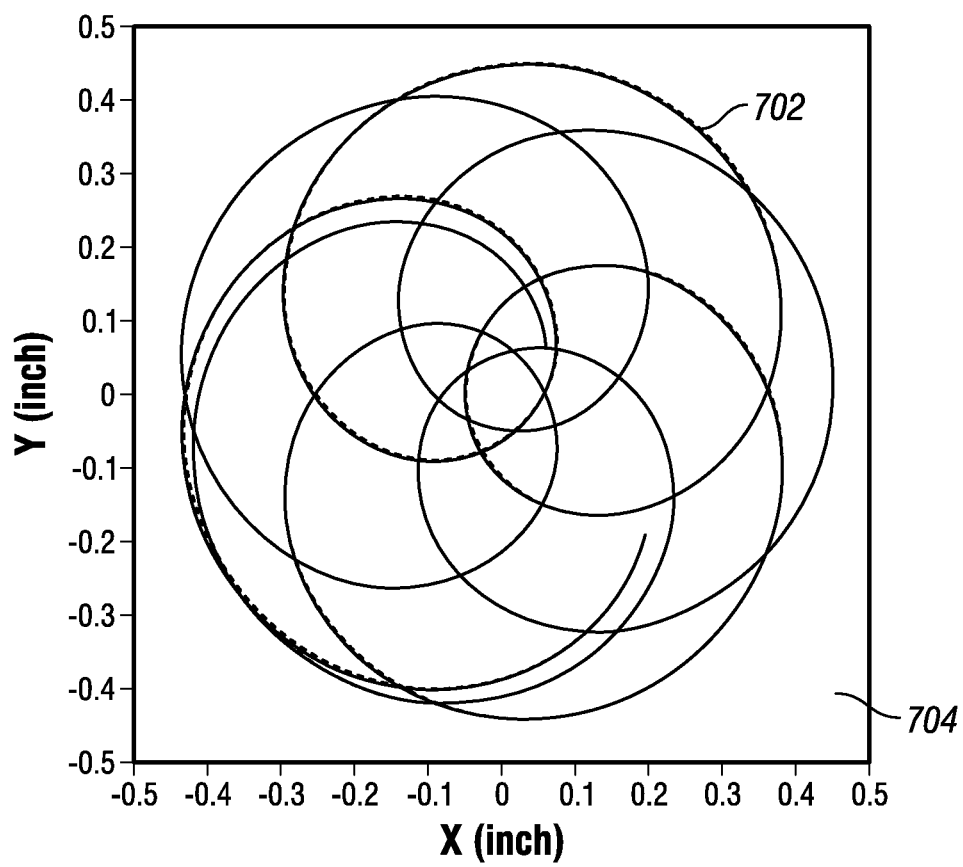
FIG. 7 is a plot tracing the motion path of the tool in an x-y plane.

Plots of equations 1.1 and 1.2 are represented in FIGS. 6A and 6B, which illustrate the position of the tool relative from well center (or other point of reference) in the x-direction and y-direction, respectively. FIG. 7 is a plot tracing the motion path 702 of the tool in an x-y plane 704, derived from the steps above.

In the representative example, fitting curves in FIG. 5 are calculated as X(t)=0.1107t−0.0615 and Y(t)=−1.2346t−0.0622. The distances in each direction are calculated over the time period by double integration of the acceleration parameters and subtracting the curve fitting lines, as shown in FIG. 6. For example, the distances in x and y direction at 5 seconds are (0.371 in., −0.512 in.).

This data can then be used to calibrate or correct the mapping of image data or other data collected by the Logging tool 200. In some embodiments, this can be accomplished by obtaining well data from the Logging tool 200 over a period of time, in which the well data is correlated with a time parameter, and obtaining the position of the Logging tool 200 with respect to a wellbore over the same period of time, in which the position of a the Logging tool 200 is also correlated with a time parameter, and associating the well data with the tool position through the time parameter.

In some embodiments, the acceleration is integrated over a short time period to minimize accumulation of error. Rather, the method 300 can be repeated for multiple short time periods to generate tool position data over the whole range of the logging operation. In some embodiments, during a certain time period based on the rate of penetration of the drilling operation, the tool 200 can be considered to be approximately in the same depth location of the borehole. Thus, the acceleration in the z direction can be ignored. In some embodiments, the steps of method 300 are performed by a processing system. The processing system may be physically located in the Logging tool 200, in the aboveground control system 124, in a remote facility, or distributed among the above.

In addition to the embodiments described above, many examples of specific combinations are within the scope of the disclosure, some of which are detailed below:

Example 1

A method of determining position of a downhole tool with respect to a wellbore, comprising:
  logging well data via the tool over a period of time
  measuring a lateral acceleration of the tool over the period of time with one or more accelerometers embedded in the tool;
  double integrating the measured acceleration of the tool over the period of time;
  obtaining a displacement of the tool over the period of time from the double integration;
  fitting the displacement of the tool over the period of time to a best fit curve, the best fit curve indicative of a lateral deviation of the wellbore;
  subtracting the best fit curve from the displacement of the tool over the period of time, the difference between the best fit curve and the displacement of the tool indicative of the position of the tool with relative to the wellbore; and
  associating the logged well data with the position of the tool, generating calibrated logging data.

Example 2

The method of example 1, further comprising forming a wellbore image from associating the logged well data and the position of the tool.

Example 3

The method of example 1, further comprising reading raw data from one or more accelerometers.

Example 4

The method of example 3, further comprising translating the raw data into the acceleration of the tool.

Example 5

The method of example 1, wherein the tool is a logging while drilling tool or a measurement while drilling tool.

Example 6

The method of example 1, wherein the tool is a wireline tool.

Example 7

The method of example 1, wherein the acceleration is in an x-direction, a y-direction, or both.

Example 8

A method of mapping downhole logging data, comprising:
  logging well data via a downhole tool over a period of time, the logged well data correlated with a time parameter;
  determining a lateral position of the downhole tool with respect to a wellbore over the same period of time, the lateral position of the downhole tool correlated with the time parameter; and
  associating the logged well data with the tool position based on the time parameter.

Example 9

The method of example 8, wherein determining the position of the downhole tool with respect to the wellbore further comprises:
  double integrating an acceleration of the downhole tool over the period of time;
  obtaining a displacement of the downhole tool over the period of time from the double integration;
  fitting the displacement of the downhole tool over the period of time to a best fit curve; and
  subtracting the best fit curve from the displacement of the downhole tool over the period of time.

Example 10

The method of example 9, further comprising obtaining the acceleration of the downhole tool over the period of time from an accelerometer onboard the downhole tool.

Example 11

The method of example 9, further comprising reading raw data from one or more accelerometers.

Example 12

The method of example 11, further comprising translating the raw data into acceleration of the downhole tool.

Example 13

The method of example 9, wherein the acceleration is in an x-direction, a y-direction, or both.

Example 14

The method of example 8, further comprising logging the well data during a logging while drilling or measurement while drilling operation.

Example 15

The method of example 8, further comprising logging the well data during a wireline operation.

Example 16

The method of example 8, further comprising forming a wellbore image from associating the well data and the tool position.

Example 17

A downhole logging system, comprising:
a downhole logging tool, comprising:
  a sensor configured to log well data over a period of time, the logged well data correlated with a time parameter; and
  an accelerometer configured to obtain the acceleration of the downhole logging tool over the period of time; and
a processing system comprising one or more processors, the processing system configured to determine a lateral position of the downhole logging tool with respect to the wellbore from the acceleration of the downhole logging tool, wherein the position of a downhole logging tool is correlated with the time parameter.

Example 18

The system of example 17, wherein the processing system is further configured to associate the logged well data with the position of the downhole logging tool based on the time parameter.

Example 19

The system of example 17, wherein all or a subset of the processors are located in the downhole logging tool.

Example 20

The system of example 17, wherein all or a subset of the processors are located in one or more above-ground facilities.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of performing a wellbore operation with a downhole tool, comprising:
  logging wellbore data with a sensor in the tool including data related to a formation surrounding a wellbore over a period of time;
  measuring a lateral acceleration of the tool over the period of time with one or more accelerometers embedded in the tool;
  double integrating, using a processor, the measured acceleration of the tool over the period of time;
  obtaining, using a processor, a displacement of the tool over the period of time from the double integration;
  fitting, using a processor, the displacement of the tool over the period of time to a best fit curve, the best fit curve indicative of a lateral deviation of the wellbore;
  subtracting, using a processor, the best fit curve from the displacement of the tool over the period of time, the difference between the best fit curve and the displacement of the tool being indicative of a lateral position of the tool relative to the wellbore; and
  associating, using a processor, the logged wellbore data with the lateral position of the tool, generating calibrated wellbore data based on the lateral position of the tool with respect to the wellbore.

2. The method of claim 1, further comprising forming a wellbore image from associating the logged wellbore data and the position of the tool.

3. The method of claim 1, further comprising reading raw data, using the processor, from one or more accelerometers.

4. The method of claim 3, further comprising translating, using the processor, raw data into the acceleration of the tool.

5. The method of claim 1, wherein the tool is a logging while drilling tool or a measurement while drilling tool.

6. The method of claim 1, wherein the tool is a wireline tool.

7. The method of claim 1, wherein the acceleration is in an x-direction, a y-direction, or both.

8. A method of logging a wellbore, comprising:
logging wellbore data with a sensor in a downhole tool including data related to a formation surrounding the wellbore over a period of time, the logged wellbore data correlated with a time parameter;
determining, using a processor, a lateral position of the downhole tool with respect to the wellbore over the same period of time, the lateral position of the downhole tool correlated with the time parameter, the determining comprising:
double integrating, using the processor, an acceleration of the downhole tool over the period of time;
obtaining, using the processor, a displacement of the downhole tool over the period of time from the double integration;
fitting, using the processor, the displacement of the downhole tool over the period of time to a best fit curve; and
subtracting, using the processor, the best fit curve from the displacement of the downhole tool over the period of time, the difference between the best fit curve and the displacement of the downhole tool being indicative of the lateral position of the downhole tool relative to the wellbore; and
associating, using the processor, the logged wellbore data with the lateral tool position based on the time parameter, generating calibrated wellbore data based on the lateral position of the tool with respect to the wellbore.

9. The method of claim 8, further comprising obtaining, using the processor, the acceleration of the downhole tool over the period of time from an accelerometer onboard the downhole tool.

10. The method of claim 8, further comprising reading, using the processor, raw data from one or more accelerometers.

11. The method of claim 10, further comprising translating, using the processor, the raw data into acceleration of the downhole tool.

12. The method of claim 8, wherein the acceleration is in an x-direction, a y-direction, or both.

13. The method of claim 8, further comprising logging the wellbore data during a logging while drilling or measurement while drilling operation.

14. The method of claim 8, further comprising logging the wellbore data during a wireline operation.

15. The method of claim 8, further comprising forming a wellbore image from associating the wellbore data and the tool position.

16. A downhole logging system, comprising:
a downhole logging tool, comprising:
a sensor configured to log wellbore data including data related to a formation surrounding a wellbore over a period of time, the logged wellbore data correlated with a time parameter; and
an accelerometer configured to obtain a lateral acceleration of the downhole logging tool over the period of time; and
a processing system comprising one or more processors, the processing system configured to:
determine a lateral position of the downhole logging tool with respect to the wellbore from the lateral acceleration of the downhole logging tool, wherein the lateral position of the downhole logging tool is correlated with the time parameter, by:
double integrating, using the processor, the lateral acceleration of the downhole tool over the period of time;
obtaining, using the processor, a displacement of the downhole tool over the period of time from the double integration;
fitting, using the processor, the displacement of the downhole tool over the period of time to a best fit curve; and
subtracting the best fit curve from the displacement of the downhole tool over the period of time, the difference between the best fit curve and the displacement of the downhole tool being indicative of the lateral position of the downhole tool relative to the wellbore; and
associate the logged wellbore data with the lateral position of the downhole logging tool based on the time parameter, generating calibrated wellbore data based on the lateral position of the tool with respect to the wellbore.

17. The system of claim 16, wherein all or a subset of the processors are located in the downhole logging tool.

18. The system of claim 16, wherein all or a subset of the processors are located in one or more above-ground facilities.

\* \* \* \* \*